H. BEIL.
ANTISKID DEVICE FOR MOTOR VEHICLES.
APPLICATION FILED JUNE 16, 1920.

1,353,560.

Patented Sept. 21, 1920.

Inventor:
Hugo Beil
by Jas. H. Churchill
atty.

UNITED STATES PATENT OFFICE.

HUGO BEIL, OF LAWRENCE, MASSACHUSETTS.

ANTISKID DEVICE FOR MOTOR-VEHICLES.

1,353,560.   Specification of Letters Patent.   Patented Sept. 21, 1920.

Application filed June 16, 1920. Serial No. 389,481.

*To all whom it may concern:*

Be it known that I, HUGO BEIL, a citizen of the United States, residing in Lawrence, in the county of Essex and State of Massachusetts, have invented an Improvement in Antiskid Devices for Motor-Vehicles, of which the following description, in connection with the accompanying drawings, is a specification, like characters on the drawings representing like parts.

This invention relates to motor vehicles and particularly to automobiles of the pleasure type, and has for its object to provide means whereby skidding of the wheels may be prevented or at least reduced to a minimum.

To this end, one or more of the wheels has coöperating with it a chute or pipe leading from a receptacle carried by the vehicle and containing sand or like material.

The chute or pipe for the best results is arranged with its outlet or discharge end above a horizontal plane through the axis of the wheel with which it coöperates and also in front of a vertical plane through said axis, so as to discharge the sand upon the tire or shoe of the wheel and thereby coat the latter more or less, and convert the smooth slippery surface of the tire or shoe into a roughened or gripping surface, which when engaged with the slippery roadway will prevent skidding of the wheel or at least reduce skidding to such extent as to avoid accidents therefrom.

Provision is made for controlling the flow of sand to the wheel by the operator of the vehicle, as will be described.

The flow of sand is controlled by a valve which is self-cleaning as will be described.

These and other features of this invention will be pointed out in the claim at the end of this specification.

Figure 1:
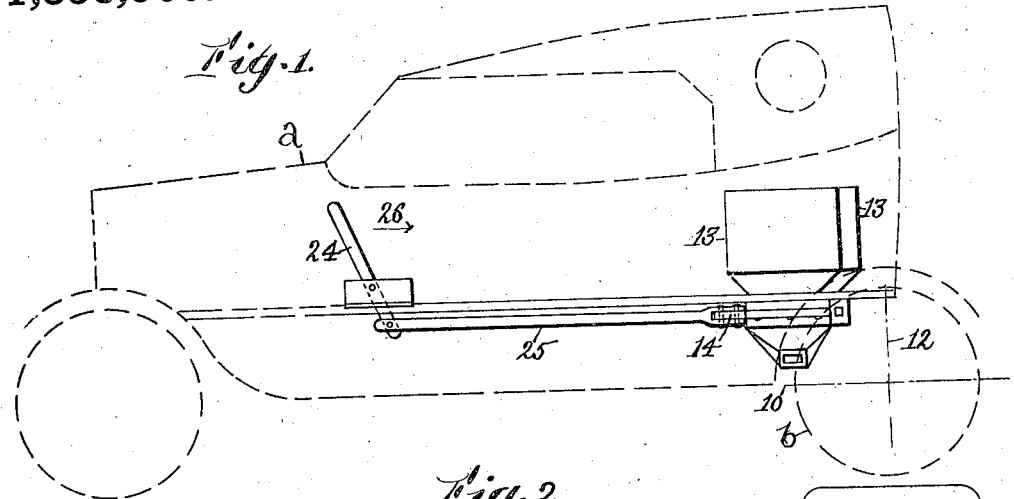

Figure 1 represents in elevation in automobile embodying this invention.

Figure 2:
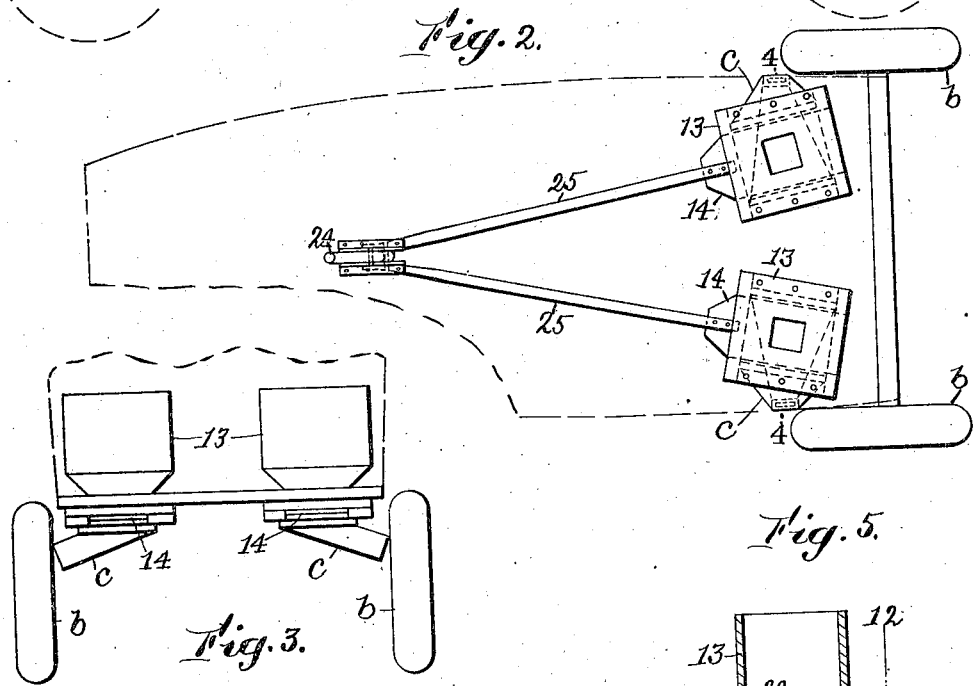

Fig. 2, a plan view of the sanding device for the rear wheels, the vehicle being shown in outline.

Figure 3:
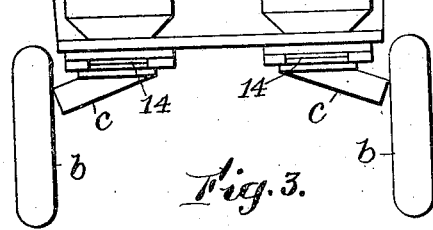

Fig. 3, a rear elevation of the vehicle shown in Fig. 1.

Figure 4:
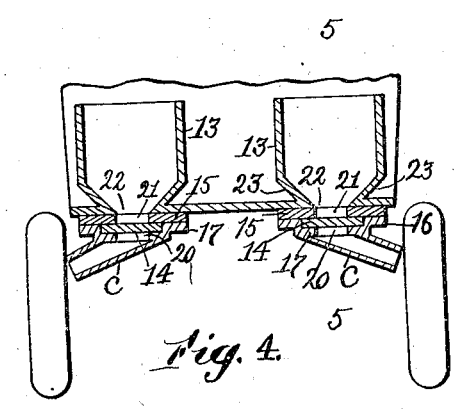

Fig. 4, a transverse section on the line 4—4, Fig. 2, and

Figure 5:
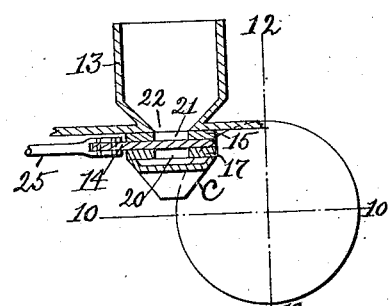

Fig. 5, a vertical section on line 5—5, Fig. 4, looking in the direction of the arrow.

Referring to the drawing, $a$ represents a motor vehicle of any known or desired construction. The vehicle $a$ is represented as a pleasure automobile and has coöperating with its rear wheels $b$ chutes or pipes $c$, having their outlet mouths located above a horizontal plane 10 through the axes of the wheels and in front of a vertical plane 12 through said axes.

In the present instance, each chute or pipe $c$ communicates with a receptacle 13 carried by the vehicle and designed to contain sand or like gripping material. The flow of sand from the container or receptacle 13 is controlled by a slide valve or plate 14, which is mounted to slide in a suitable casing, herein shown as composed of an upper member 15 and a lower member 16, which latter is provided with an offset portion 17 (see Fig. 4), which coöperates with the upper member 15 to form a way in which the valve 14 slides.

The lower member 16 has attached to it the discharge chute or pipe $c$, which leads laterally therefrom. The offset portion 17 of the lower member 16 is provided with an opening 20, which communicates with the chute $c$ and is designed to be normally covered by the valve 14. The upper member 15 is also provided with an opening 21, which registers with or is in alinement with the opening 20 and which registers with an opening 22 in the bottom of the receptacle 13. The opening 21 is normally closed by the valve 14 and prevents escape of the sand or other material from the receptacle 13.

The flow of sand or like material out of the receptacle is facilitated by providing the latter with inclined walls 23, which converge toward the opening 22. The slide valve 14 may be operated in any suitable manner and is represented as operated by a lever 24 pivoted to the vehicle $a$ in position to be worked by the operator of the vehicle, and said valve may be connected with said lever by a link or rod 25. The lever 24 is shown as located at the front of the vehicle and as one suitable for operation by hand, but it may be such as to be operated by the foot of the operator. In order that a single lever may simultaneously operate the valves 14 controlling the flow of sand or like material to the two rear wheels of the vehicle, the valves 14 and their casings are arranged so as to converge and enable their links or rods 25 to be connected with the single operating lever 24, but it is not desired to limit the invention to this particular arrangement.

By reference to Fig. 1, it will be seen that when the operator of the vehicle pulls the lever 24 backward or in the direction of the arrow 26, the links 25 and the valves 14 are drawn forward, and the openings 20, 21, are uncovered, which allows the sand to flow by gravity from the receptacles 13 through the chutes or pipes c onto the surface of the tire or shoe of the motor vehicle, which under skidding conditions are more or less wet, and sufficient of the sand will adhere to the wet surface of the tire or shoe, to provide the latter with a sufficiently roughened or gripping surface to prevent lateral or skidding movement of the wheels.

By locating the chutes or pipes c so that their outlet mouths are in front of a vertical plane through the axis of each rear wheel, and above a horizontal plane through said axis, the sand is deposited on that portion of the tire or shoe about to be brought into contact with the ground, so that the gripping surface of the wheels formed by the sand or the like is brought into engagement with the slippery or wet roadway and becomes effective to grip the roadway substantially in an instant and before the wheels can start to skid.

By locating the outlet mouth of the chutes or pipes above a horizontal plane through the axes of the wheels, the operative relation of the outlet mouths of the chutes to the rear wheels is insured both when the vehicle is light and also when heavily loaded.

In the present instance, anti-skid devices are shown for both rear wheels, but if desired additional devices for the front wheels may be provided.

To facilitate operation of the valve 14 with a minimum effort and to render the valve self-clearing, the valve casing is open at its rear end as shown in Fig. 3, which enables the valve to push the sand in front of it out through the rear opening in the valve casing when the valve is being closed, which prevents clogging of the valve and loss of sand when the device is not being used.

In the present instance, one construction of mechanism is shown but it is not desired to limit the invention to the particular construction shown.

I have described the invention as embodied in a pleasure motor vehicle, but it is not desired to limit the invention in this respect, as it is equally applicable to commercial motor vehicles.

Claim.

The combination with a motor vehicle provided with wheels, of a receptacle for sand or like material carried by said vehicle and provided with an outlet pipe having its outlet mouth arranged in front of a vertical plane through the axis of a wheel of said vehicle and above a horizontal plane through said axis, a valve casing interposed between said receptacle and said outlet pipe and open at its rear end, a valve slidable in said casing to control the flow of material from the receptacle onto the circumference of said wheel, and means under control of the operator of said vehicle for operating said valve.

In testimony whereof, I have signed my name to this specification.

HUGO BEIL.